US006162371A

United States Patent [19]

Rees et al.

[11] Patent Number: 6,162,371

[45] **Date of Patent: *Dec. 19, 2000**

[54] STABILIZED ACIDIC CHLORINE BLEACH COMPOSITION AND METHOD OF USE

[75] Inventors: Wayne M. Rees; Debra S. Hilgers; Margaret Coyle-Rees, all of Racine; Timothy Moodycliffe, Milwaukee, all of Wis.

[73] Assignee: S. C. Johnson & Son, Inc., Racine, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/996,021

[22] Filed: Dec. 22, 1997

[51] Int. Cl.$^7$ ............................ C01B 11/04; C01B 11/06; C01B 7/24

[52] U.S. Cl. ............................... 252/187.22; 252/187.24; 252/187.25; 252/187.27; 252/187.33

[58] Field of Search ............................. 252/187.1, 187.2, 252/187.22, 187.24, 187.25, 187.26, 187.28, 187.32, 187.33, 189; 422/37

[56] References Cited

U.S. PATENT DOCUMENTS

| | | | |
|---|---|---|---|
| 3,177,111 | 4/1965 | Everett | 162/73 |
| 3,328,294 | 6/1967 | Self et al. | 210/62 |
| 3,749,672 | 7/1973 | Golton et al. | 252/186.34 |
| 3,767,586 | 10/1973 | Rutkiewic | 252/187.1 |
| 3,932,605 | 1/1976 | Vit | 424/51 |
| 4,229,313 | 10/1980 | Joy | 510/303 |
| 4,740,212 | 4/1988 | Yant et al. | 8/108.1 |
| 4,822,512 | 4/1989 | Auchincloss | 252/187.24 |
| 4,992,195 | 2/1991 | Dolan et al. | 252/187.26 |
| 5,449,476 | 9/1995 | Sherbondy et al. | 252/181 |
| 5,503,768 | 4/1996 | Tokuoka et al. | 252/189 |
| 5,683,654 | 11/1997 | Dallmier et al. | 422/14 |
| 5,795,487 | 8/1998 | Dallmier et al. | 210/754 |
| 5,972,239 | 10/1999 | Coyle-Rees | 252/187.25 |
| 5,976,386 | 11/1999 | Barak | 210/756 |

FOREIGN PATENT DOCUMENTS

| | | |
|---|---|---|
| 649898A2 | 10/1994 | European Pat. Off. . |
| 824147A1 | 3/1997 | European Pat. Off. . |
| 932750 | 7/1963 | United Kingdom . |
| 2078522A | 1/1982 | United Kingdom . |
| WO98/21308 | 9/1998 | WIPO . |

*Primary Examiner*—Joseph D. Anthony

[57] ABSTRACT

The composition of this invention is a stabilized acidic bleaching composition comprising an aqueous solution of a source of source of unipositive chlorine ion, a chlorine stabilizing agent, and an acidic buffer to stabilize the pH of the bleaching composition in the range from about 2 to 6.5, wherein the chlorine stabilizing agent and the source of source of unipositive chlorine ion are in a molar ratio of greater than about 1:1. Methods are described for removal of lime scale from a hard surface controlling microbial activity as well as reducing malodor by applying the composition of this invention.

13 Claims, No Drawings

STABILIZED ACIDIC CHLORINE BLEACH COMPOSITION AND METHOD OF USE

TECHNICAL FIELD

This invention relates to a stabilized acidic bleaching solution that does not substantially degrade during storage and which is particularly effective as a cleaner for removing soap scum, lime scale, mold and mildew from treated surfaces. The invention also relates to a method for reducing malodor, as well as removing lime scale, soap scum, mold and mildew from hard surfaces. The invention further relates to microbial control on surfaces.

BACKGROUND ART

Cleaning compositions with bleach as an active ingredient and sulfamic acid as a stabilizer have long been known. For example, UK Patent Application GB 932,750 discloses a powdered cleansing composition containing alkali metal monopersulfate salts and alkali metal chlorides in combination with a nitrogen-containing chlorine-hypochlorite acceptor such as sulfamic acid. The chlorine generated upon the addition of water to the composition is said to be tied up by the nitrogen-containing chlorine-hypochlorite acceptor so as to reduce or eliminate the expected chlorine odor.

A sanitizing composition which is said to have an improved shelf life in the dry state is described in UK Patent Application GB 2078522. The composition comprises sodium or calcium hypochlorite, an acid source which desirably includes sulfamic acid in combination with another non-reducing acid such as malic acid or succinic acid, and a surfactant. The acid content of the composition is said to enhance the ability of the composition to sanitize surfaces coated with lime scale or milk stone. This composition, however, has been reported to evolve chlorine gas when stored in damp conditions or when prepared in concentrated aqueous solutions.

U.S. Pat. No. 4,822,512 reportedly overcomes this problem through the use of a low level of water-soluble inorganic halide in the composition, such as sodium chloride. In particular, a water-soluble biocidal composition is described as (a) 0.01 to 5 parts by weight of a water-soluble inorganic halide, (b) 25 to 60 parts by weight of an oxidizing agent which, in aqueous solution, reacts with halide to generate hypohalite ions, (c) 3 to 8 parts by weight of sulfamic acid, (d) 0 to 20 parts by weight of an anhydrous non-reducing organic acid such as malic acid or succinic acid and (e) 10 to 30 parts by weight of an anhydrous alkali metal phosphate. The pH of a 1% by weight aqueous solution of this composition is between about 1.2 and 5.5. The aforementioned references, however, are directed to dry or powder compositions and thus do not contemplate the problems associated with aqueous liquid bleach solutions.

In particular, it is well known that the addition of an aqueous hypochlorite solution to an acidic cleaning solution will generally result in the evolution of potentially dangerous amounts of chlorine gas, and a loss of stability. A number of compositions have been proposed in an attempt to overcome this problem. U.S. Pat. No. 3,749,672 is directed to buffered aqueous solutions having a pH between 4 and 11 which are prepared by adding a hypochlorite such as sodium hypochlorite to certain N-hydrogen compounds such as sulfamic acid. The buffer is necessary to neutralize acid produced during decomposition of the solution. In particular, it is said that stable bleaching compositions under acid conditions (e.g. pH of about 4.0 to 6.9) may be obtained when there is an excess of sulfamate (e.g., a mole ratio less than 2:1 of hypochlorite to sulfamate). No suggestion, however, is made that decreasing the hypochlorite:sulfamate ratio to less than 1:1 will have a stabilizing effect, and no ratio less than 1.5:1 is exemplified. Indeed, no increase in stability is exhibited when the hypochlorite:sulfamate ratio drops from 2:1 to 1.5:1 at a pH of 5.

U.S. Pat. No. 5,503,768 describes a halogen scavenger constituted by an aromatic ring and at least one group which contains a lone-pair-containing heteroatom adjacent to the aromatic ring. The electron donating aromatic compound, i.e., the halogen scavenger, can be added to an acid cleaner which when mixed with an oxidizing agent such as sodium hypochlorite prior to use suppresses the release of halogen gas. It is reported that it is desirable to add the electron donating aromatic compound to the acid cleaner in an approximately equal molar amount to the halogen estimated to be released upon the mixture of the acid cleaner with the oxidizing agent. However, this reference does not address either the long term or short term stability of these solutions.

There continues, however, to be a need for stable liquid acidic bleaching compositions that do not result in the substantial generation of potentially hazardous chlorine gas during storage. Such acidic bleaching compositions, i.e., those with low chlorine gas generation, that have excellent bleaching efficacy, effectively remove lime scale while demonstrating microbial control are particularly desirable.

SUMMARY OF THE INVENTION

The composition of this invention is a stabilized acidic bleaching composition comprising an aqueous solution of a source of source of unipositive chlorine ion, a chlorine stabilizing agent, and an acidic buffer to stabilize the pH of the bleaching composition in the range from about 2 to 6.5, wherein the chlorine stabilizing agent and the source of source of unipositive chlorine ion are in a molar ratio of greater than about 1:1. In a preferred embodiment of the invention, the acidic buffer is selected from the group consisting of citric acid, polyacrylic acid, succinic acid, glutaric acid, adipic acid,phosphoric acid, copolymers of maleic acid with vinyl ethers, copolymers of maleic acid with acrylic acid, copolymers of acrylic acid with vinyl ethers, and mixtures thereof. In another preferred embodiment of the invention, a source of source of unipositive bromine ion is added. In another preferred embodiment, a surfactant is added. In yet another preferred embodiment boric acid or borate salts may be added to significantly enhance the limescale removal efficacy of the composition of this invention.

The stabilized acidic bleaching composition of this invention is highly effective for bleaching mold stains on hard surfaces, such as ceramic tiles and the like, and for removal of lime scale from these surfaces. The inventive solution may also be employed for bleaching foods, beverages and general soil stains on other hard surfaces such as linoleum, as well as soft surfaces such as shower curtains and textiles (e.g., laundry, upholstery and carpeting). The compositions of this invention also demonstrate microbial control activity, i.e., sanitizing or disinfecting properties.

MODES OF CARRYING OUT THE INVENTION

The following terms used herein are defined. The term "alkyl" refers to a straight or branched alkyl group containing from 1 to 20 carbon atoms. The term "cycloalkyl" refers to a cyclic alkyl group containing up to 20 carbon atoms. The term "aryl" refers to a group derived from a cyclic aromatic compound having up to 20 carbon atoms.

Chlorine stabilizing agents are well known and include, for example, sulfamic acid and water soluble salts thereof, alkyl sulfamates, cycloalkyl sulfamates, aryl sulfamates, alkyl sulfonamides and aryl sulfonamides. Sulfamic acid and water soluble salts thereof are particularly preferred. Such water soluble salts include, for example, sodium, potassium, magnesium, calcium, lithium and aluminum salts of sulfamic acid. Other particularly preferred chlorine stabilizing agents include, for example, benzene sulfonamide, toluene sulfonamide and 4-carboxybenzene sulfonamide melamine. Sulfamic acid itself, however, is most preferred.

Generally, the chlorine stabilizing agent is present in the acidic bleaching composition in an amount between about 0.1% to about 20.0% by weight of the composition, preferably between about 1% to about 10% by weight of the composition. However, a critical aspect of this invention is that the chlorine stabilizing agent should be combined with the source of unipositive chlorine ion at a molar ratio of the chlorine stabilizing agent to unipositive chlorine ion is greater than about 1:1, preferably from about 1.5:1 to about 4:1, most preferably from about 2.1:1 to about 2.5:1. For example, sulfamic acid, possessing a single —$NH_2$ group, provides 1 mole of stabilizing agent per mole of sulfamic acid. The same applies to 4-carboxy benzene sulfonamide and para-toluene sulfonamide.

Melamine, possessing three —$NH_2$ groups, provides 3 moles of stabilizing agent per mole of melamine.

Significantly, when sulfamate is employed as the chlorine stabilizing agent it has been found that the use of the above-defined sulfamate to unipositive chlorine ion ratio shifts the equilibrium of the resulting composition away from formation of the di-N-chlorosulfamate, and towards the more stable mono-N-chlorosulfamate, i.e., $HClNSO_3Na$. This effect is illustrated in Table A below.

TABLE A

Effects of sulfamate to hypochlorite mole ratio on mono & di-N-Chlorosulfamate concentrations. The concentration of chlorosulfamates are expressed in units of molarity (M). Solutions are citrate buffered and have a pH of about 4.0.

| Mole Ratio Sulfamate to Hypochlorite | [Di-N-Chloro-sulfamate], M | [Mono-N-Chloro-sulfamate], M |
|---|---|---|
| 0.59:1.00 | 0.099 | 0.037 |
| 0.75:1.00 | 0.069 | 0.097 |
| 1.00:1.00 | 0.043 | 0.149 |
| 1.50:1.00 | 0.025 | 0.185 |
| 5.00:1.00 | 0.008 | 0.219 |

With out being bound to theory, it is believed that this equilibrium shift results in the unexpectedly advantageous composition of this invention that are highly stable and especially useful for simultaneous bleaching, microbial and limescale removal applications, particularly where lower pH compositions are desired (e.g., about pH 5 and below, more preferably about pH 4 and below, and most preferably between pH of about 2 to about 4).

The stabilized acidic bleaching composition of this invention contains a source of unipositive chlorine ion. A convenient source of this ion is a hypochlorite salt. Other convenient sources of unipositive chlorine ion include, for example, hypochlorous acid and aqueous solutions of chlorine gas, and N-chloro compounds, e.g., N-chlorinated isocyanurates, N-chloro melamines, and N-chloro hydantoins. The hypochlorite salts employed in the present invention include, for example, potassium hypochlorite, sodium hypochlorite, lithium hypochlorite, calcium hypochlorite and the like. Sodium hypochlorite is most preferred.

Generally the hypochlorite salt is present in an amount between about 0.1% to about 10% by weight of the composition, preferably about 0.25% to about 5% by weight of the composition. The amount of hypochlorite salt will depend upon the desired bleaching and antimicrobial efficiency of the resulting stabilized acidic bleaching solution.

A source of unipositive bromine ion is optionally added to the composition of this invention to enhance bleaching and microbial control performance. Elemental bromine, or a bromide or bromate salt of lithium, sodium, potassium, calcium, magnesium, or zinc, in combination with the source of source of unipositive chlorine ion may serve as a source of source of unipositive bromine ion. It is also possible to add hypobromite salts directly. The source of source of unipositive bromine ion may be present in amounts ranging from 0.05% to about 5%, preferably from 0.05% to about 2%.

The composition of this invention also contains an acidic buffer system, comprising a weak acid ($pK_a$ from about 2 to about 7) and its conjugate base, and capable of stabilizing the pH in the range from about 2 to 6.5. Preferably the pH of the composition is about 2 to about 6, most preferably about 2 to about 4. Examples of suitable buffers include those derived from citric acid, succinic acid, glutaric acid, adipic acid, polyacrylic acid, phosphoric acid, copolymers of maleic acid with vinyl ethers, copolymers of acrylic acid with maleic acid, and copolymers of acrylic acid with vinyl ethers. Preferred buffer systems are those based on citric acid and polyacrylic acid. The buffer system is present in an amount ranging from about 0.2% to about 20% by weight of the composition, preferably from about 1% to about 10% by weight of the composition.

The composition of this invention contains water as the solvent due to its low cost and environmental and safety concerns. However, if desired, other solvents may be admixed. Such exemplary solvents include tertiary alcohols, e.g., tert-butyl alcohol and tert-amyl alcohol, as well as various glymes and diglymes (e.g., dialkyl ethers of ethylene glycol, diethylene glycol, propylene glycol, and dipropylene glycol) which can enhance the cleaning of oil-borne stains.

Surfactant(s) may also be included to enhance the cleaning and/or foaming properties of the stabilized acidic bleaching composition of this invention. Such surfactants include, but are not limited to, anionic sulfonated or sulfated surfactants, for example, linear alkyl benzene sulfonates, alkyl sulfates, alkyl sulfonates, alcohol ether sulfates, and the like. Preferred surfactants are sodium lauryl sulfate, sodium dodecylbenzenesulfonate, secondary alkyl sulfonates, sodium lauryl ether sulfates, alcohol ethoxy carboxylates and alkyl diphenyl oxide disulfonates. Other surfactants that may be present, but are less preferred, are ethoxylated nonionic surfactants, amine oxides, e.g., lauryl dimethyl amine oxide, alkyl betaines, alkyl sulfobetaines, and tetraalkyl quaternary ammonium surfactants. The amount of surfactant utilized in the acidic bleaching composition is determined by the surfactant cleaning properties as well as the particular application for which the acidic bleaching composition is formulated. Generally, the surfactant is present in an amount between 0.05% and about 10% by weight of the composition, preferably between 0.05% and about 5% by weight of the composition.

Optionally, the acidic bleaching composition may contain boric acid or borate salts, e.g., various alkali metal borate salts such as anhydrous borax (disodium tetraborate), disodium octaborate tetrahydrate, and dipotassium decarborate octahydrate. The presence of these materials has been found to significantly enhance the limescale removal efficacy of the acidic bleaching composition. If employed, the boric acid or borate salts are typically present in an amount from about 0.1% to about 2.0% by weight of the composition, preferably from about 0.2% to about 1.0% by weight of the composition.

The compositions of this invention may also contain thickening agents to enhance the viscosity of the compositions. Increasing the viscosity of compositions can improve their optimal use on vertical surfaces. Such thickened compositions generally would have a viscosity in a range from about 0.5 centipoise to about 2500 centipoise at about room temperature, preferably about 100 centipoise to 1000 centipoise. Exemplary thickening agents include surfactants such as alkyl ether sulfates, oxidation resistant polymers such as acrylate resins (e.g., Carbopol® 672 or 676, B. F. Goodrich Specialty Chemicals, Cleveland, Ohio), or clays (e.g., Laponite®, Southern Clay Products, Inc., Gonzales, Tex.).

The stabilized acidic bleaching composition of this invention is preferably prepared by first combining the stabilizer with an aqueous solution containing some or all of the components of the acidic buffer solution. The resulting mixture should possess enough acidic buffer capacity to prevent the pH of the solution from rising above 7 upon addition of the unipositive halogen source. Without being bound to any theory, It is believed that chlorine solutions at a pH above 7 experience rapid chlorine loss due to oxidation of sulfamate. Accordingly, it is preferable that the acidic buffer capacity of the mixture should allow the pH of the mixture to rise upon addition of a hypochlorite source, such that the final acidic pH is very close to that desired of the final composition. Next, the source of unipositive chlorine is slowly added to the solution with good mixing. If a pH adjustment of the resulting mixture is required, this may be accomplished by adding additional acidic or basic components of the buffer system, or adding an appropriate amount of strong acid or strong base until the desired pH is obtained. Other components, e.g., surfactants, thickening agents, solvents, or fragrances, may be added as desired.

The present invention is also directed to the method of using the stabilized acidic bleaching solution of this invention to clean hard surfaces, especially those for which removal of lime scale and microbial control is desired.

The stabilized acidic bleaching composition of this invention is highly effective for bleaching mold stains on hard surfaces, such as ceramic tiles and the like. The inventive solution may also be employed for bleaching food, beverage and general soil stains on other hard surfaces such as linoleum, as well as on soft surfaces such as laundry, upholstery and carpeting.

The examples which follow are intended as illustrations of certain preferred embodiments of the invention, and no limitation of the invention is implied.

Examples 1, 2, and 3 detail the preparation of citrate-buffered solutions.

EXAMPLE 1

Preparation of Stabilized Acidic Bleach Compositions with a 0.67:1.0 Molar Ratio of Sulfamate:NaOCl and pH Values of 2.8 and 5.0

Trisodium citrate dihydrate (37.5 g), citric acid monohydrate (27.0 g) and sulfamic acid (26.4 g, 0.272 mol) were dissolved in deionized water (750 g). Aqueous sodium hypochlorite (360 g of an 8.50% solution, 0.410 mol) was added slowly with stirring. The solution with a pH of 2.8 was prepared by addition of concentrated hydrochloric acid to adjust the pH. The solution with a pH of 5.0 was prepared by addition of solid sodium hydroxide. Each solution was diluted with additional deionized water to bring the total mass of the solution to 1.500 kg.

EXAMPLE 2

Preparation of Stabilized Acidic Bleach Compositions with a 1.0:1.0 Molar Ratio of Sulfamate:NaOCl and pH Values of 2.8 and 5.0

Solutions with a 1.0:1.0 molar ratio of sulfamate:hypochlorite and pH values of 2.8 and 5.0 were prepared as described in Example 1, except that the amount of sulfamic acid added was 39.3 g (0.405 mol).

EXAMPLE 3

Preparation of Stabilized Acidic Bleach Compositions with a 2.5:1.0 Molar Ratio of Sulfamate:NaOCl and pH Values of 2.8 and 5.0

Solutions with a 2.5:1.0 molar ratio of sulfamate:hypochlorite and pH values of 2.8 and 5.0 were prepared as described in Example 1, except that the amount of sulfamic acid added was 98.3 g (1.02 mol), and the pH adjustment to 2.8 was accomplished by adding solid sodium hydroxide.

All samples from Examples 1, 2, and 3 were evaluated for stability of the total available chlorine content as a function of time by aging at room temperature (22° C.) and at a slightly elevated temperature (40° C.). Samples were analyzed for total available chlorine content immediately after preparation and at known time intervals thereafter.

Known aliquots of sample solutions were analyzed for total available chlorine content, expressed in units of molarity, using iodometric titration methods with acidic potassium iodide and standardized sodium thiosulfate solutions (see Kirk-Othmer Encyclopedia of Chemical Technology, Volume 5, "Chloroamines and Bromoamines (Analysis)").

The total available chlorine concentration as a function of time for the citrate-buffered solutions with pH values of 2.8 and 5.0, and various molar ratios of sulfamate:hypochlorite is presented in Tables 1, 2 and 3.

TABLE 1

Solutions with pH of 2.8, stored at 22° C. (chlorine concentrations expressed as molarity, bracketed values indicate the percentage of the initial total available chlorine remaining)

| Day | Mole Ratio 0.67:1.0 | Mole Ratio 1.0:1.0 | Mole Ratio 2.5:1.0 |
|---|---|---|---|
| 0 | 0.233 | 0.285 | 0.314 |
| 7 | 0.229 [97] | 0.283 [99] | 0.314 [100] |
| 21 | 0.190 [82] | 0.270 [94] | 0.314 [100] |
| 35 | 0.000 [0] | 0.245 [86] | 0.311 [99] |
| 49 | — | 0.000 [0] | 0.310 [99] |

TABLE 2

| Solutions with pH of 2.8, stored at 40° C. (chlorine concentrations expressed as molarity, bracketed values indicate the percentage of the initial total available chlorine remaining) | | | |
|---|---|---|---|
| Day | Mole Ratio 0.67:1.0 | Mole Ratio 1.0:1.0 | Mole Ratio 2.5:1.0 |
| 0 | 0.233 | 0.285 | 0.314 |
| 4 | 0.010 [4] | 0.250 [87] | 0.312 [99] |
| 7 | — | 0.000 [0] | 0.311 [99] |
| 21 | — | — | 0.308 [98] |
| 35 | — | — | 0.298 [95] |
| 49 | — | — | 0.271 [86] |

TABLE 3

| Solutions with pH of 5.0, stored at 22° C. (chlorine concentrations expressed as molarity, bracketed values indicate the percentage of the initial total available chlorine remaining) | | | |
|---|---|---|---|
| Day | Mole Ratio 0.67:1.0 | Mole Ratio 1.0:1.0 | Mole Ratio 2.5:1.0 |
| 0 | 0.233 | 0.285 | 0.314 |
| 7 | 0.233 [100] | 0.286 [100] | 0.314 [100] |
| 21 | 0.229 [97] | 0.283 [99] | 0.308 [98] |
| 35 | 0.228 [98] | 0.280 [98] | 0.306 [97] |
| 49 | 0.220 [94] | 0.280 [98] | 0.304 [97] |

TABLE 4

| Solutions with pH of 5.0, stored at 40° C. (chlorine concentrations expressed as molarity, bracketed values indicate the percentage of the initial total available chlorine remaining) | | | |
|---|---|---|---|
| Day | Mole Ratio 0.67:1.0 | Mole Ratio 1.0:1.0 | Mole Ratio 2.5:1.0 |
| 0 | 0.233 | 0.285 | 0.314 |
| 7 | 0.231 [99] | 0.283 [99] | 0.311 [99] |
| 21 | 0.204 [88] | 0.269 [94] | 0.309 [96] |
| 35 | 0.200 [86] | 0.258 [91] | 0.295 [94] |
| 49 | 0.170 [73] | 0.245 [86] | 0.288 [92] |

The data in Tables 1, 2, 3, and 4 show that the stability of the bleach compositions is greatly increased when the ratio of sulfamate:hypochlorite is greater than 1:1, especially at lower pH values and at higher temperatures.

The solutions described in Examples 4, 5, and 6 were buffered with sodium polyacrylate.

EXAMPLE 4

Preparation of a Stabilized Acidic Bleach Composition with a 0.67:1.0 Molar Ratio of Sulfamate:NaOCl and a pH Value of 3.8

Aqueous polyacrylic acid (50% solution, 60.0 g, Goodrite K-7058, B. F. Goodrich Specialty Chemicals, Cleveland, Ohio), aqueous sodium polyacrylate (45% solution, 20 g, Goodrite K-7058N, B. F. Goodrich), sulfamic acid (17.5 g, 0.180 mol), and deionized water (600 g) were combined. Aqueous sodium hypochlorite solution (14.3% solution, 140.0 g, 0.269 mol) was slowly added with stirring. The pH of the mixture was adjusted to 3.8 by adding a small amount of concentrated hydrochloric acid. The total mass of the mixture was increased to 1.000 kg by adding deionized water.

EXAMPLE 5

Preparation of a Stabilized Acidic Bleach Composition with a 1.0:1.0 Molar Ratio of Sulfamate:NaOCl and a pH Value of 3.8

The titled composition was prepared in a manner similar to that described in Example 4, except that the amount of sulfamic acid added was 26.1 g (0.270 mol), and the pH of the mixture was adjusted to 3.8 by adding solid sodium hydroxide.

EXAMPLE 6

Preparation of a Stabilized Acidic Bleach Composition with a 2.5:1.0 Molar Ratio of Sulfamate:NaOCl and a pH Value of 3.8

The titled composition was prepared in a manner similar to that described in Example 4, except that the amount of sulfamic acid added was 65.3 g (0.673 mol), and the pH of the mixture was adjusted to 3.8 by adding solid sodium hydroxide.

The total available chlorine concentration as a function of time for the polyacrylate-buffered solutions with various molar ratios of sulfamate:hypochlorite is presented in Tables 5 and 6.

TABLE 5

| Acrylate buffered solution, pH 3.8, stored at 22° C. (total available chlorine expressed as molarity, bracketed values indicate the percentage of the initial total available chlorine remaining). | | | |
|---|---|---|---|
| Day | Mole Ratio 0.67:1.0 | Mole Ratio 1.0:1.0 | Mole Ratio 2.5:1.0 |
| 0 | 0.279 | 0.282 | 0.299 |
| 11 | 0.260 (93) | 0.270 (96) | 0.287 (97) |
| 34 | 0.036 (13) | 0.258 (91) | 0.286 (97) |
| 41 | 0.000 (0) | 0.251 (89) | 0.285 (96) |
| 77 | — | 0.220 (78) | 0.278 (94) |

TABLE 6

| Acrylate buffered solution, pH 3.8, stored at 40° C. (total available chlorine expressed as molarity, bracketed values indicate the percentage of the initial total available chlorine remaining). | | | |
|---|---|---|---|
| Day | Mole Ratio 0.67:1.0 | Mole Ratio 1.0:1.0 | Mole Ratio 2.5:1.0 |
| 0 | 0.279 | 0.282 | 0.299 |
| 4 | 0.238 (85) | 0.268 (95) | 0.294 (99) |
| 11 | 0.000 (0) | 0.228 (81) | 0.285 (96) |
| 15 | — | 0.004 (1) | 0.284 (96) |
| 41 | — | — | 0.263 (86) |

The data in Tables 5 & 6 show that the stability of the bleach compositions is greatly increased when the ratio of sulfamate hypochlorite is greater than about 1:1.

EXAMPLE 7

Evaluation of Lime Scale Dissolution (a) Preparation of Stabilized Bleach Solution.

A solution containing 3.0% trisodium citrate dihydrate, 3.0% citric acid monohydrate, 6.0% sulfamic acid, 13.9% aqueous sodium hypochlorite (14.4% by weight), and 1.0% boric acid was prepared by a method similar to that employed in Examples 1–3. The pH of the solution was adjusted to 3.0 by adding solid sodium hydroxide. The molar ratio of sulfamate:hypochlorite was found to be 2.1:1.0. The concentration of total available chlorine, determined by iodometric titration, was 0.291 M.

(b) Lime Scale Dissolution: Method 1.

Marble chips of known mass (Fisher Scientific, UK Limited) were soaked in the solution from part (a) without agitation for 8 hours at 22° C. The chips were removed from the solution, washed with deionized water, dried overnight at 50° C. and weighed. The percent dissolution was calculated as the percentage of the original mass lost by the chips. The results of three such experiments are shown in Table 7A.

TABLE 7A

| Initial Mass of Chips | Final Mass of Chips | % Dissolution |
|---|---|---|
| 5.07 g | 3.72 g | 26.6% |
| 5.02 g | 3.59 g | 28.5% |
| 5.02 g | 3.68 g | 26.7% |

A similar composition as described above was prepared without boric acid. Lime scale dissolution experiments were performed as described above. The results of three such experiments are shown in Table 7B.

TABLE 7B

| Initial Mass of Chips | Final Mass of Chips | % Dissolution |
|---|---|---|
| 5.09 g | 4.35 g | 14.5% |
| 5.03 g | 4.24 g | 15.7% |
| 5.07 g | 4.28 g | 15.6% |

In similar experiments, using deionized water in place of the solution of Example 7, no marble chip mass loss was observed.

(c) Lime Scale Dissolution: Method 2.

Calcium carbonate powder (99+%, Aldrich Chemical Company, Milwaukee, Wis.) was added to rapidly stirred 100.0 g samples of the solution from part (a). The time required to completely dissolve the calcium carbonate, judged as the time when the white suspension became a clear solution, was recorded. The results of three such experiments are shown in Table 8.

TABLE 8

| Mass of Calcium Carbonate | Time for Total Dissolution |
|---|---|
| 1.00 g | 20 sec. |
| 1.50 g | 60 sec. |
| 2.00 g | 140 sec. |

Thus, the buffered, stabilized chlorine solution of Example 7 has the ability to dissolve significant amounts of calcium carbonate, a major constituent of lime scale, in either chip or powder form.

EXAMPLE 8

Preparation of a Thickened Stabilized Acidic Bleach Composition 80.0 g citric acid monohydrate, 60.0 g trisodium citrate dihydrate, and 114.8 g sulfamic acid (1.18 moles) were dissolved in 1200 g of deionized water. Aqueous sodium hypochlorite (275 g of a 16.0 % solution, 0.59 moles) was slowly added with good stirring. Subsequently, the pH was adjusted to 3.5 with the addition of solid NaOH. 12.0 g of boric acid and 6.0 g of NaBr were added, followed by pH readjustment to 3.5 with additional solid NaOH. The total mass of the resulting solution was adjusted to 2.00 kg using additional deionized water.

A thickened bleach solution was prepared by combining 400 g of the above solution with 20.0 g of sodium alcohol ethoxy sulfate (Stepan Steol CS-230, 30% actives solution, Stepan Chemical Company, Northfield, Ill.) and 10.0 g sodium alcohol ethoxy sulfate (Stepan Steol CS-130, 30% actives solution, Stepan Chemical Company, Northfield, Ill.). The total available chlorine content of the thickened bleach solution was determined via iodometric titration to be 1.75% (expressed as % NaOCl). The viscosity of the thickened bleach solution was measured as 685 centipoise at 22° C. (Brookfield RV viscometer, spindle #1, 10 rpm).

Limescale removal studies were conducted using the thickened bleach solution in a similar manner to that outlined in Example 7(b). The results of three such experiments are illustrated in Table 9.

TABLE 9

| Initial Mass of Chips | Final Mass of Chips | Mass Loss |
|---|---|---|
| 5.17 g | 4.40 g | 14.9% |
| 5.20 g | 4.41 g | 15.2% |
| 5.05 g | 4.26 g | 15.6% |

Bleaching evaluations with the thickened bleach solution were conducted using mold stained tiles, prepared by spraying a concentrated aqueous suspension of Aspergillus Niger mold (ATCC 6275) spores onto the porous surface of 10 cm×10 cm white ceramic tiles using a Preval 465 sprayer (Precision Valve Corp., Yonkers, N.Y.). The tiles were air dried for several days at room temperature and cut into 5 cm×5 cm sections prior to use. The resulting mold stained tiles had a uniform medium brown color. A 1.3 g sample of thickened bleach solution was evenly pipetted onto the 5 cm×5 cm section of mold stained tile. The stained brown tile surface was quickly bleached to a very light tan color within two minutes. After a 15 minute contact time, the tile was rinsed with a gentle stream of deionized water for 1 minute and air dried overnight. A second tile, treated with 1.3 g of deionized water, rinsed, and dried in a similar manner to that described above, showed no visible bleaching effects. Instrumental color analysis of the tiles was conducted using a Minolta CR 300 Chroma Meter (1 cm diameter port), measuring 6 separate areas on the surface of the stained tiles. The results set forth in Table 10 below are provided as average ΔL readings (CIE L*a*b* color scale), relative to an unstained, untreated white ceramic tile, standard ($L_{stained\ tile}-L_{standard\ tile}$).

TABLE 10

| Tile-Treatment | ΔL Prior to Treatment | ΔL After Treatment |
|---|---|---|
| Thickened Bleach Solution | 26.7 | 4.9 |
| Deionized Water | 23.6 | 26.2 |

As demonstrated in Table 10 above, since the ΔL standard is an unstained white tile, the smaller the difference value is, the more closely the treated tile approximates the unstained white tile. Thus, the treatment with the thickened bleach solution nearly returns the tile to it's original white color.

EXAMPLE 9

Malodor Reduction Evaluation

The ability of the compositions of the present invention to reduce malodor was demonstrated with the following test utilizing a synthetic bathroom malodor Methodology A malodor solution was obtained containing the following raw materials and diluted with deionized water to make a 1% solution.

| Malodor Reagents - Solution A | % w/w |
|---|---|
| • Dipropyleneglycol | 62.82 |
| • Thioglycolic Acid | 21.18 |
| • n-Caproic Acid | 6.00 |
| • n-Methyl Morpholine | 6.00 |
| • p-Cresyl Isovalerate | 2.18 |
| • 2-Thionaphthol | 0.91 |
| • Scatol (Firmenich) | 0.91 |

4g of Solution A was taken and further diluted with 1 liter of deionized water—(Solution B).

100 g of chlorosulfamate solution of Example 8 was added to solution B and placed in a sniff test chamber of 2 cubic meters. (Product A). This was repeated with a second sniff test chamber of the same volume.—(Product B)

In the third sniff test chamber was placed 1 liter of solution B and 100 g of deionized water—(Product C).

In the fourth sniff test chamber was placed 1 liter of deionized water and 100 g of a chlorosulfamate solution of Example 8. (Product D)

After all four products were left undisturbed in the chambers for about 30 minutes, members of the S. C. Johnson & Son, Inc. expert sniff test panel were then asked to score the intensity of malodor on a 60 point scale. A score of zero meaning extremely weak and a score of 60 being extremely strong. Each member was asked to sniff all four booths.

Results 17 responses were obtained and the mean score calculated for each product, the following results were obtained:

Product A mean score—13.12

Product B mean score—15.29

Product C mean score—43.41

Product D mean score—4.91

Conclusions

There was a significant difference in malodor strength between products C and A and between C and B. No significant difference was noted between A and B. It was concluded from these results that the composition of the present invention significantly reduced the malodor.

EXAMPLE 10

Microbial Control Evaluation

Antimicrobial performance of a stabilized hypochlorite formulation containing 2,000 ppm total available chlorine was evaluated using the IsoGrid Hydrophobic Grid Membrane Filtration Disinfectant Efficacy Test (QA Life Sciences, Inc., 6645 Nancy Ridge Dr., San Diego, Calif. 92121). Efficacy versus *Escherichia coli, Staphylococcus aureus* and *Pseudomonas aeruginosa* was evaluated using a 5 minute contact time.

A base formulation was prepared in a manner similar to that outlined in Example 2. The citrate-buffered formulation was determined to have a total available chlorine concentration of 9,811 ppm, a one to one mole ratio of sulfamate stabilizer to hypochlorite and a pH of 5.0. This base solution was diluted using sterile deionized water to produce a test solution having a the total available chlorine concentration of 2,000 ppm.

The following modifications in the Disinfectant Efficacy Test methodology were made:

1. The test species were inoculated in Tryptic Soy Broth rather than Nutrient Asparagine Broth as called for in the manual.
2. The test suspension of each organism was diluted down to approximately a 5 log titer in fresh broth. A 10.0 ml aliquot of the dilution was then used to inoculate the test filters to achieve the desired 6 log challenge per test filter (vs. three 1.0 ml inoculation aliquots of a 6 log titer as specified by the IsoGrid manual).

In order to achieve "countable" control filters, an aliquot of the above 5 log titer was diluted using fresh broth to achieve a 1 log titer. The control filters were then inoculated with 10 ml aliquots to achieve a final 2 log challenge per control filter.
3. Treatment with the test solution was done by pipeting a 12 ml aliquot of the test solution onto the filter and allowing the solution to remain in contact with the filter for the desired 5 minute contact time.
4. The Letheen Fast Green Agar specified in the Manual to culture the neutralized test membranes was replaced with standard nutrient agar containing Fast Green FCF dye Following an incubation period of 24 hours at 35° C. (48 hours for *S. aureus*), the filters were evaluated as specified in the IsoGrid Methods Manual. The results shown are mean log microbial reduction values: *triplicate tests were performed versus *E. coli;* duplicate tests were performed versus *S. aureus* and *P. aeruginosa.*

| Screening vs. *E. coli* | MPN LOG MN* | MPN Geom. MN | LOG Microbial Reduction |
|---|---|---|---|
| Positive Control | 7.62 | $4.14 \times 10^7$ | — |
| Stabilized Hypochlorite | 2.89 | $7.76 \times 10^2$ | 4.73 |
| Screening vs. *S. aureus* | | | |
| Positive Control | 7.12 | $1.31 \times 10^7$ | — |
| Stabilized Hypochlorite | 1.69 | $4.94 \times 10^1$ | 5.42 |
| Screening vs. *P. aeruginosa* | | | |
| Positive Control | 6.60 | $4.03 \times 10^6$ | — |
| Stabilized Hypochlorite | 0.866 | $7.34 \times 10^0$ | 5.74 |

In all cases, the positive controls were treated only with sterile deionized water.

As shown above, the substrates achieved a 4–6 log reduction in microbial contaminants when treated with compositions of the present invention.

Industrial Applicability

The present invention advantageously provides a stabilized acidic bleaching solution which can be effectively manufactured using conventional means that does not substantially degrade during storage. The solutions of the present invention are particularly effective as a cleaner for removing soap scum, lime scale, mold and mildew from hard and soft surfaces. The invention also provides deodorizing and microbial control properties, as well as removing lime scale, soap scum, mold and mildew from hard surfaces.

Other variations and modifications of this invention will be obvious to those skilled in the art. This invention is not limited except as set forth in the claims.

What is claimed is:

1. A stabilized acidic bleaching composition comprising an admixture of:

(a) a bleaching source of unipositive chlorine ion;

(b) a chlorine stabilizing agent selected from the group consisting of sulfamic acid, alkyl sulfamates, cycloalkyl sulfamates, aryl sulfamates and melamine;

(c) an acidic buffer present in an amount effective to provide said bleaching composition with a pH in a range of about 2 to about 6.5, wherein said acidic buffer comprises a weak acid and a salt of said weak acid; and (d) water;

wherein the molar ratio of chlorine stabilizing agent to the unipositive chlorine ion in the composition is greater than about 1:1.

2. A stabilized acidic bleaching composition according to claim 1, further comprising a thickening agent.

3. A stabilized acidic bleaching composition according to claim 1, wherein the source of unipositive chlorine ion is selected from the group consisting of hypochlorite ion, hypochlorous acid, and an aqueous solution of chlorine gas.

4. A stabilized acidic bleaching composition according to claim 3, wherein the weak acid of said acidic buffer is selected from the group consisting of citric acid, polyacrylic acid, succinic acid, glutaric acid, adipic acid, phosphoric acid, copolymers of maleic acid with vinyl ethers, copolymers of maleic acid with acrylic acid, copolymers of acrylic acid with vinyl ethers, and mixture thereof.

5. A stabilized acidic bleaching composition according to claim 4, wherein the chlorine stabilizing agent is sulfamic acid, the source of source of unipositive chlorine ion is hypochlorite ion, and the molar ratio of sulfamic acid to hypochlorite ion is in a range of from about 1.5:1 to about 4:1.

6. A stabilized acidic bleaching composition according to claim 5, wherein said bleaching composition further comprises boric acid or a borate salt in an amount effective to enhance limescale removal by the composition.

7. A stabilized acidic bleaching composition according to claim 5, wherein said bleaching composition has a pH in a range from about 2 to about 4.

8. A stabilized acidic bleaching composition according to claim 7, wherein the molar ratio of sulfamic acid to hypochlorite ion is in a range of from about 2:1 to about 2.5:1.

9. A stabilized acidic bleaching composition according to claim 5, further comprising a source of unipositive bromine ion in an amount in the range from about 0.05% to about 5% by weight of the composition.

10. A stabilized acidic bleaching composition according to claim 9, wherein the source of source of unipositive bromine ion is chosen from the group consisting of a bromide or bromate salt of sodium, lithium, potassium, calcium, magnesium or zinc and elemental bromine.

11. A stabilized acidic bleaching composition according to claim 5, further comprising a surfactant in an amount in the range from about 0% to about 10% by weight of the composition.

12. A stabilized acidic bleaching composition according to claim 11, wherein the surfactant is selected from the group consisting sodium lauryl sulfate, sodium octyl sulfonate, sodium dodecylbenzenesulfonate, secondary alkyl sulfonates, sodium lauryl ether sulfates and alkyl diphenyl oxide disulfonates.

13. A stabilized acidic bleaching composition according to claim 11, wherein the surfactant is selected from the group consisting of $C_8$–$C_{16}$ alkyl sulfates, alkyl benzene sulfonates, secondary alkyl sulfonates, $C_8$–$C_{18}$ alkyl ether sulfates, alkyl diphenyl oxide disulfonates, and alcohol ethoxy carboxylates.

* * * * *